(No Model.) 6 Sheets—Sheet 3.

G. BEEKMAN.
COTTON HARVESTER.

No. 501,670. Patented July 18, 1893.

WITNESSES:
Edward Thorpe
A. R. Dunne

INVENTOR
Gerard Beekman
BY
Henry F. Parker,
ATTORNEY

(No Model.)
6 Sheets—Sheet 4.

G. BEEKMAN.
COTTON HARVESTER.

No. 501,670. Patented July 18, 1893.

WITNESSES:
Edward Thorpe
A. R. Dunne

INVENTOR
Gerard Beekman.
BY
Henry F. Fisher
ATTORNEY (No Model.) 6 Sheets—Sheet 6.

G. BEEKMAN.
COTTON HARVESTER.

No. 501,670. Patented July 18, 1893.

WITNESSES:
Eugene Lucas
A. J. McCoy

INVENTOR
Gerard Beekman.
BY
Henry F. Parker
ATTORNEY.

UNITED STATES PATENT OFFICE.

GERARD BEEKMAN, OF NEW YORK, N. Y.

COTTON-HARVESTER.

SPECIFICATION forming part of Letters Patent No. 501,670, dated July 18, 1893.

Application filed September 29, 1892. Serial No. 447,285. (No model.)

*To all whom it may concern:*

Be it known that I, GERARD BEEKMAN, a citizen of the United States, residing in the city, county, and State of New York, have invented certain new and useful Improvements in Cotton-Harvesters, of which the following is a specification.

My invention relates to pickers wherein rotary flexible stems are employed to seize the cotton; and my said invention especially relates to the character of picker described in my patent application, Serial No. 389,932, filed April 22, 1891, wherein the flexible picking stems are projected in groups from subordinate oscillatory supports attached to a common or main rotary support, and the groups made to enter and retire from the branches while moving backward at substantially the same rate of speed as the motion of the harvester forward over the ground.

My invention consists in a compound picker, wherein the groups are employed in plural vertical series, and driven by common shafts in the rotary support whereby the capacity of the machine is accordingly increased without multiplicity of operating mechanism.

My invention also comprises certain novel mechanism for imparting the various motions to the pickers.

Having reference to the accompanying drawings, in which similar letters and figures of reference indicate corresponding parts throughout the several views.

The herein-described mechanism is applicable to a harvester carriage of any suitable construction.

Figures 1, 2:
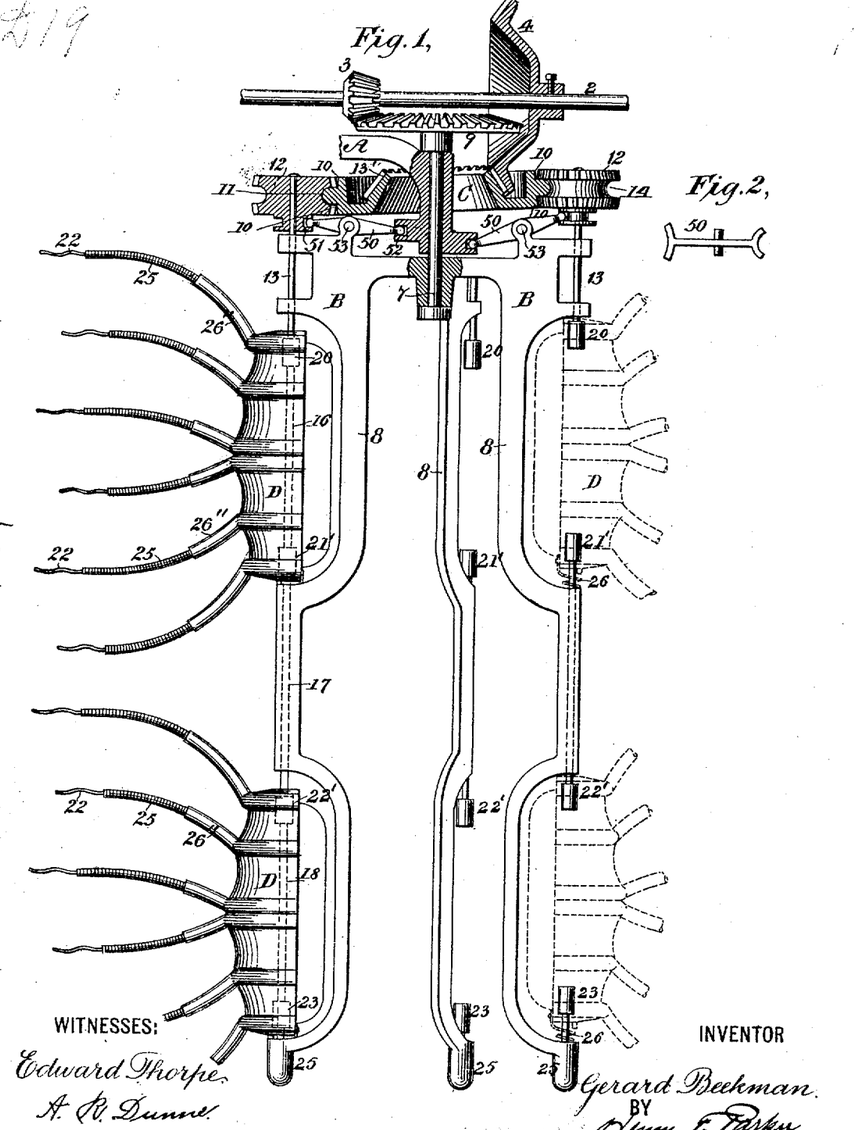
Figure 1, is a vertical sectional elevation, showing the compound arrangement of the groups of pickers referred to and suitable actuating mechanism therefor.
Fig. 2, is a detail view of one of the lifting levers in Fig. 1.
Figure 3:
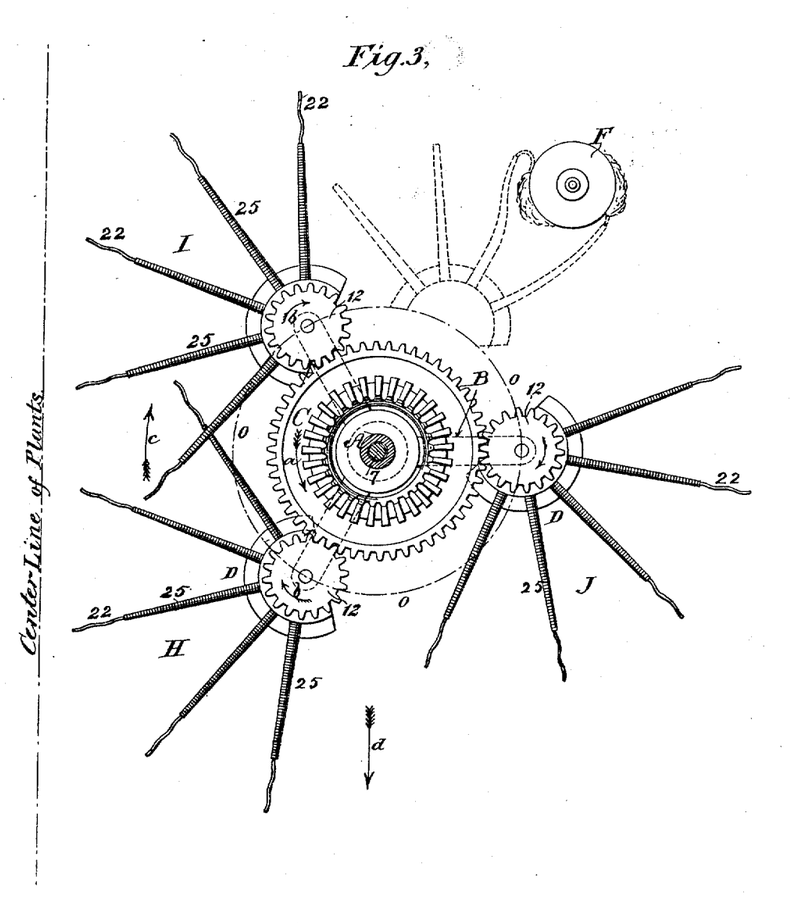
Fig. 3, a plan view of Fig. 1, illustrating the operation of the pickers.

A, Figs. 1 and 3, represents a part of the supporting frame of the harvester; 2, the shaft whereby the mechanism is actuated; 3, a bevel gear thereon for rotating the main support B, through gear 9, and pintle 7; and 4, a bevel gear meshing with the beveled part of the annular gear C, from which the systems of picking stems 22, 22, are all rotated. The main support B, is composed of a trifurcated frame having depending arms 8, 8, 8, the same being carried upon the pintle 7. The several subordinate supports D, D, are attached to oscillate freely on vertical axes formed by the picker driving shaft sections 16, 18, in the arms 8, 8, 8.

The annular gear C, and gears 12, are rotated in the direction indicated by arrows *a, b,* Fig. 3, by means of the gear 4; and the main support B, is rotated in the direction of the arrow *c,* by means of the gear 3.

The machine is assumed in Fig. 3, to be traveling over the ground in the direction of the arrow *d.* Each picking stem 22, thereby moves backward in reference to the advancement of the machine, and is so moved at substantially the same rate of speed as the said advancement. The picking stems 22, thereby enter and withdraw endwise in searching the branches in the row of plants, the position of which is designated by a dotted line representing the center line of the row.

The annular gear C, bears two sets of gear teeth 10, 10, one above the other; between which a convex rib 11, projects. The three toothed-pinions 12, 12, 12, above the respective picker cases, upon shafts 13, bear each two series of teeth corresponding with those in the annular gear C, and between which series of teeth there are annular grooves 14, corresponding in form and fitting the annular rib 11, of the gear C. The annular gear C, revolves in an inclined plane by reason of the rise and fall of the pinions 12, as they pass in circuit for purposes hereinafter described. In order to admit of such motion while preserving the transmitting connection between the gear and pinions, and also in order to support and actuate the said annular gear C, in the desired manner, the aforesaid rib and grooves are provided.

The system of gears C, and 12, 12, 12, may be substituted by friction wheels having smooth peripheries and similar tongues and grooves, imparting motion from one to another by frictional contact.

The picker driving shafts are composed of sections 13, 16, 17, 18, Fig. 1, suitably coupled together. The couplings 20, 21', 22', 23, are composed of screw-threaded collars adapted to tighten by rotation. The lower ends of the driving shafts are supported in supports 25, in the extremities of the arms 8, 8, 8. This arrangement permits the easy removal of any subordinate support D and substitution of another.

The subordinate supports D, and driving shafts are counter-balanced by springs 26, 26, which are also torsional, and tend to oppose the said supports in oscillating so as to partially but not wholly overcome the frictional force of the gearing which tends to project the picking stems in the direction toward which they move in the orbit of the frame B. The groups J, and H, are thus projected in Fig. 3. The group I, is represented as trailing out from the plant; the stems 22, being detained by friction with the branches.

F, in Fig. 3, represents the stripping device, which consists in a revolving brush, and the picking stems are again detained in the same manner as indicated by dotted lines; the springs 26, assisting.

The springs 26, relieve the lifting levers 50, and their operating cam 52, from undue friction by thus supporting the parts that would otherwise depend thereon. Such levers 50, and cam 52, will be hereinafter more fully described.

Figures 5, 7, 9:
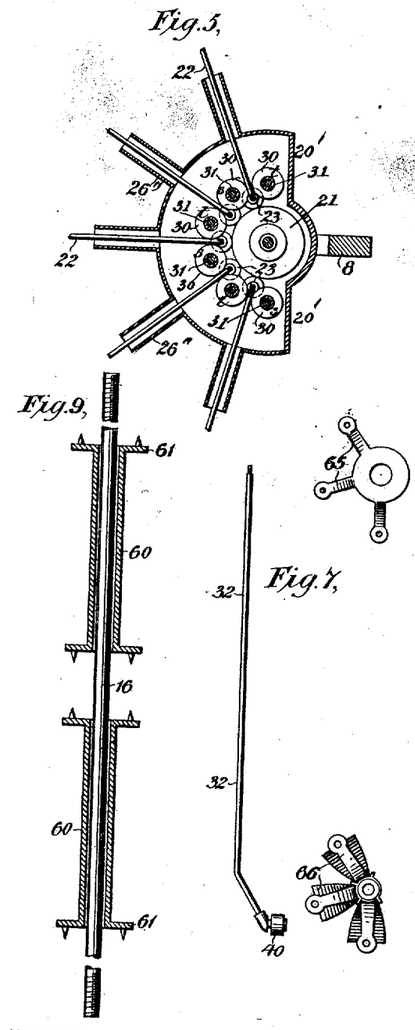
Fig. 5, a horizontal section of Fig. 4, taken on the line *x—x.
Fig. 7, a detail view showing one of the axes of the idle spindles and its upper and lower springs detached.
Fig. 9, a sectional detail view showing the construction of the picker driving shaft.

The oscillations of the supports D, are limited by contact of their surfaces 20', with the arm 8, as seen in Fig. 5.

Figures 4, 15, 16:
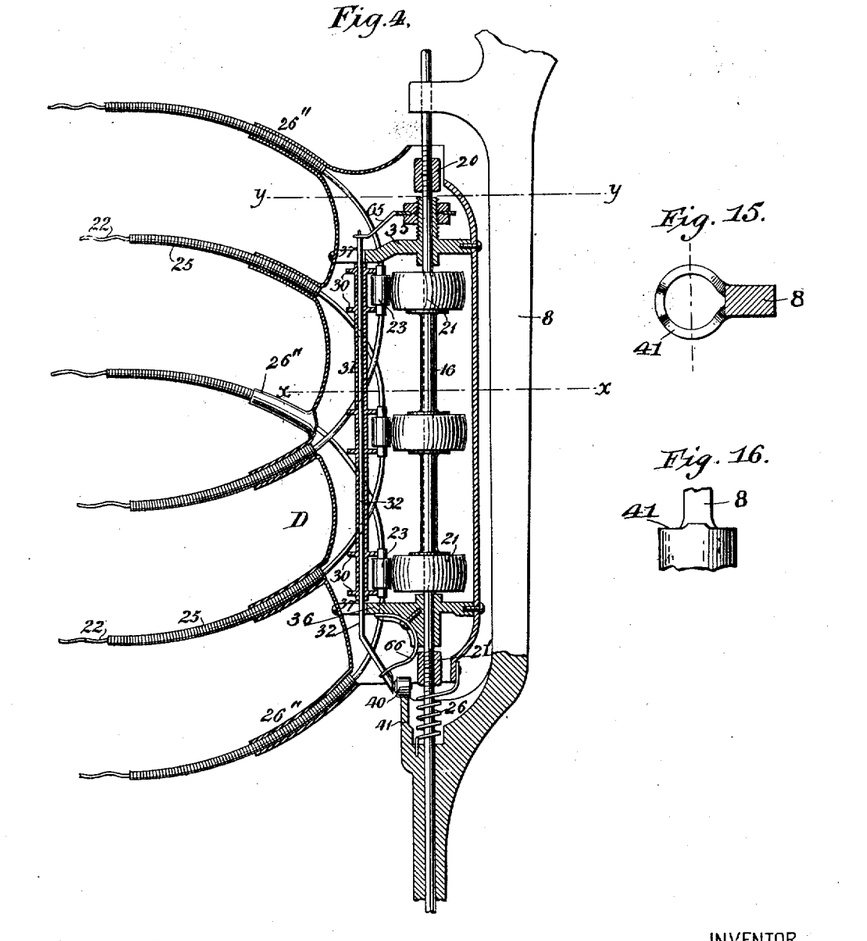
Fig. 4, an enlarged vertical sectional view of one of the subordinate supports for the pickers bearing a group thereof, showing the actuating mechanism.
Fig. 15, is a plan view of a cam employed for arresting the picking stems at a certain time.
Fig. 16, is an elevation of said cam.

The shaft sections 16, 18, bear frictional driving rollers 21, seen in Fig. 4, which are composed of suitable material adapted to promote engagement. Distancing sleeves 60, Fig. 9, having flanges 61, space the rollers on the shaft.

The picking stems 22, are composed of hide or other suitable flexible strands, and are supported in flexible arms 25, composed of coiled wire. The arms 25, are supported in sleeves 26'', projected rigidly from the case D. Said stems 22, extend from the respective ends of the bobbins 23, so that each bobbin actuates two pickers.

The bobbins 23, have an enlarged central body, upon which the driving rollers 21, engage, and reduced extremities upon which the flanges 30, of the idle spindles 31, engage to hold them in contact. These spindles 31, rotate freely upon axes 32, composed of wire as seen in Fig. 7. Some of the spindles 31, are capable of radial retraction or advancement toward the driving rollers 21, to throw the bobbins into or out of gear. As seen in plan view in Fig. 5, the number of idle spindles 31, is sufficient to include and support all the bobbins 23, each between three points; two thereof upon the peripheries of the adjacent spindles, and one upon the driving rollers 21. The hollow spindles 31, are supported endwise between plates 35, 36, and the spindle rods 32, extend through them, and may move vertically, while the vertical displacement of the hollow spindles 31, is prevented by the said plates.

Figure 6:
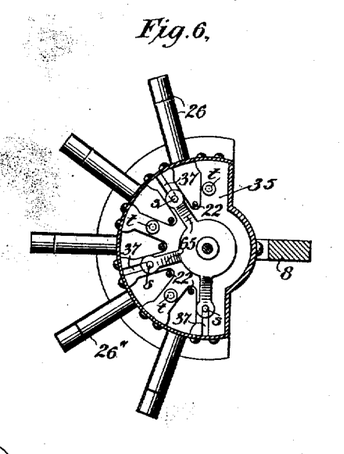
* Fig. 6, a horizontal section taken on the line *y—y,* Fig. 4.
Figure 8:
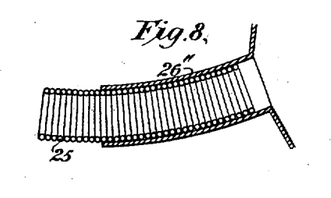
Fig. 8, an enlarged sectional view showing the construction of the flexible arms for supporting the strands and the mode of fastening the same into the picker case.

The alternate spindles s, s, s, Figs. 5 and 6, are actuated retractively, while those t, t, t, are journaled stationarily in the plates 35 and 36. All the spindles 31, may be made retractible if desired.

The spindles 31, designated by s, s, s, have their rods 32, extended beyond the plates 35, 36, as in Fig. 4, through radial slots 37, in said plates (see Fig. 6) and oblique springs 65, 66, are employed to support the extremities of said rods and press them downward. The upward or downward motion of the rods will, owing to the oblique position of said springs, cause the retraction or advancement respectively of the spindle and bobbins against the rollers 21, and this vertical motion is obtained by means of cams 41, and rollers 40, at the lower extremities of the rods 32.

When the support D, is raised as at the right hand portion of Fig. 1, (indicated by dotted lines,) the rollers 40, (Fig. 4) are out of contact with the cams 41, while in the lower position of such supports D, as at the left-hand portion of Fig. 1, and in Fig. 4, the rollers 40 are in contact with said cams, the spindle 31, being prepared to retract. The cams 41, have such contour that when the supports D, are depressed, those picking stems 22, which extend in different radial planes, are successively arrested from spinning motion, while the support D, revolves upon its vertical axis to the extent of its oscillation. The supports D, are depressed when opposite the stripping brush F, and the stems 22, are arrested as described when they come into contact therewith, permitting the removal of the cotton.

Figs. 15 and 16, plainly show the contour of the cams 41, the extent of movement of the rollers 40, being about half the circumference of the cam, or to the dotted line shown in Fig. 15.

In order to depress the supports D, when opposite the stripping brush, levers 50, are employed (Fig. 2, showing a plan view thereof); the same engaging at one end with the circumferential grooves 51, on the hubs of the pinions 12, and the other extremities with a cam-shaped groove 52, circumferential to the lower end of the support A. The said levers 50, are intermediately fulcrumed at 53, on the revolving picker frame B. The cam groove 52, which is stationary, controls the positions of the pinions 12, 12, 12, and also the vertical positions of the supports D, causing the rollers 40, to play into or out of contact with the cams 41, with the result described. The lower position of the pinions 12, is assumed as they pass in radial line with the stripping brush F, and the elevated position maintained during the remainder of their orbit.

The operation in reference to Figs. 1 to 9, inclusive, is as follows: The picker cases D, assume, when entering the plants, a position such as H, in Fig. 3, in which the group of pickers face the direction of orbital rotation in the path o. As the pickers move from the position H, to the position I, and while the harvesting machine progresses in the direction of the arrow d, each group of pickers remains automatically in one part of the plant, thus minimizing their friction against the plant and permitting the rotating pickers to remain in contact with the cotton bolls for a time, and then fasten themselves by their twisting motion upon the bolls. This automatic action allows the picking stems 22, to trail out from among the branches of the cotton plant endwise as they have previously entered. After the pickers leave the plant, subsequent to the position I, the picker case D, is swung forward automatically by the rotation of the central roller 21, again facing the direction of orbital rotation. The pickers bearing the picked cotton touch the stripping brush F, and as the cotton is stripped, the case D, while depressed as in Fig. 4, yields by its oscillatory motion, and causes the different sets of picking stems to stop spinning while touching the brush. The springs 26, partially counteract the frictional tendency of the mechanism 21, 23, so as to allow the supports to be moved partially or wholly into the advanced position indicated at H, Fig. 3, and the picking stems are thus supported in a manner whereby they will readily yield about the vertical axis of the subordinate support when encountering opposition in the plant.

Figures 12, 13, 14:
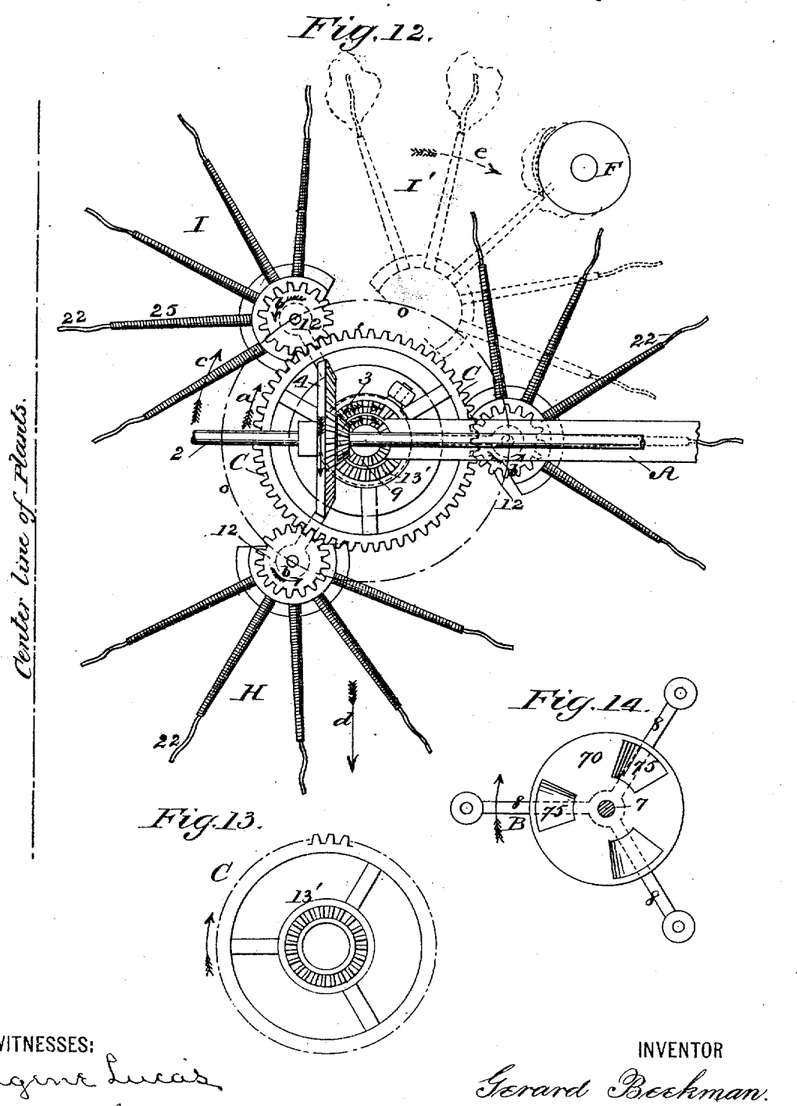
Fig. 12, is a plan view of Fig. 10.
Fig. 13, is a plan view of the oscillating gear for driving the pickers.
Fig. 14, is a plan view of the main rotary frame with the other parts removed.

The following generical description applies to Figs. 10 to 14, inclusive; A, representing a part of the supporting frame of the harvester; 2, the shaft whereby the picking mechanism is actuated; 3, the bevel gear for rotating the main support B, through bevel gear 9, and pintle 7; and 4, the bevel gear meshing with the beveled part of the annular gear C, from which the systems of picking stems 22, 22, are all rotated. The annular gear C, and gears 12, are rotated in the directions indicated by arrows a, b, Fig. 12; the said gear C, rotating in the same direction as the frame B, at a comparatively greater speed so as to revolve the said gears 12, with sufficient rapidity to actuate the pickers 22, 22, with a rapid spinning motion. The springs 26', acting torsionally between the arms 8, of the frame B, and the oscillatory supports D, in the axes of the latter, tend to revolve such supports in opposition to the direction of oscillation which the shafts 16, 18, tend to impart; that is to say, in a reverse direction from that indicated by the aforesaid arrows b. The springs 26', also tend to expand longitudinally and depress the supports D, for purposes stated in my separate patent application filed simultaneously herewith. The main support B, is rotated in the direction of the arrow c, at such speed as to move the picking stems 22, backward in contact with the plants at substantially the same rate of speed as the motion of the harvester forward over the ground. The oscillation of the gear C, is produced by means of a cam 70, upon the rotary support B, and said gear C, is provided with a series of internal anti-friction wheels 71, by means of which it rests and rotates freely upon the non-rotary collar 72, which oscillates upon a pivot 73, supporting the said wheel C, parallel to its plane. The collar 72, is provided at the side thereof opposite its pivot 73, with an anti-friction roller 74, which rests on the cam 70, in the top of the frame B. The cam 70, has three depressions 75, as seen in Fig. 14, one corresponding with each arm 8, of the frame B, carrying the subordinate supports D, and when during the rotation of the frame B, one of these depressions passes under the roller 74, the collar 72, is tilted or oscillated, producing a corresponding oscillation of the gear C, so as to depress the pinion 12, which is at that time passing the radial line in which the roller 74, projects. The roller 74, is situated toward the side of the orbit o, (Fig. 12) in which the frame B, revolves nearest the cleaning brush F, and the depressions 75, are of such circumferential length as to cause the abrupt descent of each gear 12, and quick recovery thereof to its normal level, while passing the said cleaning device F. The wheel C, occupies at other times a substantially horizontal position, as indicated by dotted lines in Fig. 10. The pivotal point of the collar 72 is substantially in a vertical line with the gear 4, and it is therefore obvious that the gears C, 4, cannot become disconnected. When the gears 12, are successively moved in the frame B, past the given point in the orbit of the latter opposite the cleaning device for removing the cotton from the picking stems 22, and depressed, they depress also the shafts 16, 18, causing the said picking stems to temporarily cease their spinning motion.

Figures 10, 11:
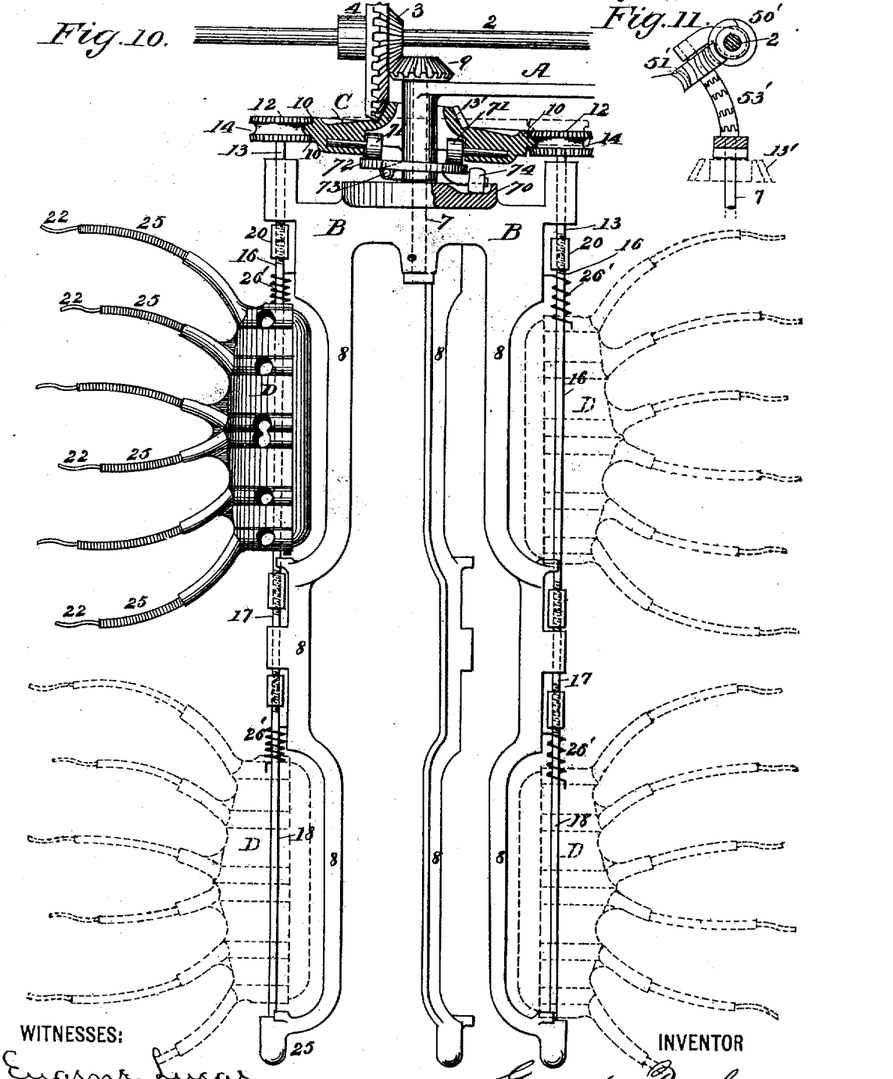
Fig. 10, a sectional elevation showing the main rotary frame and modified mechanism for revolving the same, and the pickers.
Fig. 11, is a detail view showing a modification of certain parts in Fig. 10.

The modification illustrated in Fig. 11, consists in the substitution for the bevel gears 3, and 9, of a worm 50', on the shaft 2, and the worm gear 51', upon the upper extremity of the pintle 7. The bevel gear 4, intermeshing with the crown 13', is employed as before described, to rotate the picking stems 22, and in order to properly align such gear 4, with the said crown 13', the upper extremity of the pintle 7, is diverted through the agency of a flexible wrist 53', in a curved axis of rotation such as to bring the worm gear 51', at one side of the worm 50', and obtain its engagement therewith. As a slower motion is imparted by means of the worm and worm gear the proportionate speed of the pickers to the rotation of the support B, is thereby increased.

The operation with reference to Figs. 10 to 14, inclusive, is as follows: When the frame B, is rotated in the direction of the arrow c, and the machine advances in the direction of the arrow d, the oscillatory supports D, tend to project the picking stems 22, in a direction opposite to the progress of said supports in the orbit o, through which they circulate. This occurs by reason of the frictional resistance of the picker mechanism within the supports D, prevailing over the torsional power of the springs 26', while such mechanism is in gear. The pickers at H, then enter the plants, and after extracting the cotton with which they come in contact, pass to the position I, at which they trail out from the branches of the plants during the work of extraction, and subsequently remain in such trailing position by reason of the aforesaid frictional resistance of the picker mechanism, until at a position I', approaching the cleaning brush F. The oscillatory support D, is then permitted to descend by the cam 70, as hereinbefore described; the gravity of said support D, and its shafting, together with the expansion of the springs 26', co-operating with the said cam in producing the depressing motion, arresting the pickers. The pickers afterward resume their normal positions as before described, and the operation is repeated.

The mechanism shown in Figs. 10, to 14, inclusive, for revolving the main support B, and driving the picking mechanism, is applicable to such form of mechanism in the subordinate support D, as herein illustrated in Fig. 4, or to such form as illustrated in my aforesaid separate patent application filed simultaneously herewith, or to any other suitable subordinate attachment of similar general character for spinning the picking stems.

Three or more vertical series of subordinate supports D, may be employed in the main frame B; the latter being lengthened for the purpose.

As the structure of a cotton plant and the growth of the cotton thereon is variable, hence the resistance and amount of work performed may at any given moment vary at different levels. It is advantageous, therefore, to provide means as herein described whereby the series of pickers occupying different levels may be independently oscillated, and when the group of pickers projected from one independent support are detained in a part of the plant where the cotton grows in thick clusters, the group of pickers projected from another support in vertical alignment with the first one may advance freely through a comparatively open structure of the plant in search of cotton to seize upon. The machine as a whole is thereby rendered more susceptible in its adaptation to the natural structure of the plant, and the different groups of picking stems are brought as quickly as possible into positions where they will do the most effective work.

Having thus fully described my invention, what I claim, and desire to secure by Letters Patent, is—

1. In a machine for harvesting cotton, a main rotary support, and a plurality of subordinate supports, each bearing the group of rotary picking stems; said subordinate supports being located in circular series at different levels, each having independent oscillatory motion.

2. In a machine for harvesting cotton, a rotary support, vertically aligned subordinate supports independent one from the other and each bearing groups of picking stems and mechanism for rotating them, and shafts for operating said mechanism, forming means of support and axes of oscillation for the said subordinate supports.

3. In a machine for harvesting cotton, a rotary support, vertically aligned subordinate supports, each bearing a group of picking stems and mechanism for rotating them, shafts for operating said mechanism composed of separable sections, respectively situated in the main support, and in the subordinate supports, and suitable couplings for said sections; the same when connected, forming axes of oscillation for the subordinate supports.

4. In a machine for harvesting cotton, a main rotary support, and a subordinate oscillatory support longitudinally movable thereon, a driving roller with oscillatory support, a plurality of bobbins engaging with the driving roller in common, bearing the cotton picking stems, idle spindles on which said engagement is dependent, retractible axial rods bearing the spindles, and a cam or other lifter attached to the said main support in a position adapted to encounter said spindle axes and cause the spindles to retract successively when the subordinate support is oscillated while at one extremity of its longitudinal movement.

5. In a machine for harvesting cotton, a rotary support, a plurality of driving shafts longitudinally movable therein, a picking mechanism substantially such as described, dependent for its action or in-action upon the longitudinal positions of said shafts, pinions on the shafts, and a central oscillating driving gear having a supporting engagement with said pinions through the agency of tongues and grooves.

6. In a cotton harvester, the combination of a main rotary support, a longitudinally movable driving shaft thereon for the pickers, and a picking mechanism substantially as described, depending for its action or inaction upon the longitudinal position of said shaft, a pinion on the said shaft, and an oscillating driving gear central to the axis of the main support, and means for rotating the same, and a cam upon the main support concentric with the said gear for producing its oscillation, substantially as described.

7. In a machine for harvesting cotton, a driving roller, a bobbin bearing a cotton picking stem, an idle spindle, a sliding spindle rod for retracting the spindle from the bobbin, oblique springs commonly inclined supporting the extremities of said rod, and an encountering cam or other lifter for moving the said spindle rod and retracting the spindle.

8. In a cotton harvester, the combination of a main rotary support, subordinate oscillatory supports, rotating picking stems thereon, and mechanism for rotating the same; the oscillatory supports tending to revolve one way by the frictional action of the said mechanism, and springs tending to revolve said supports the other way, substantially as and for the purposes described.

9. In a cotton harvester, the combination of a main rotary support, longitudinally movable driving shafts thereon for the pickers, and a picking mechanism dependent for its action or inaction upon the longitudinal positions of said shafts, pinions on the shafts, an oscillating driving gear central to the axis of the main support engaging with and determining the positions of said pinions substantially as described, a rotary cam fixed upon the axis of the main rotary support beneath said driving gear having depressions corresponding to each of said shafts, and interposed between such cam and the driving gear a non-rotary vibrating disk supporting the latter and bearing a projection adapted to be moved by said depressions at intervals as described.

GERARD BEEKMAN.

Witnesses:
EUGENE LUCAS,
H. F. PARKER.